United States Patent [19]

Hamm et al.

[11] 4,369,624

[45] Jan. 25, 1983

[54] HIGH TEMPERATURE GAS TURBINE SYSTEMS

[75] Inventors: James R. Hamm, Murrysville; William E. Young, Churchill, both of Pa.

[73] Assignee: Westinghouse Electric Corp., Pittsburgh, Pa.

[21] Appl. No.: 222,093

[22] Filed: Jan. 2, 1981

[51] Int. Cl.³ .............................................. F02B 43/08
[52] U.S. Cl. ...................................... 60/39.12; 60/683
[58] Field of Search ......... 60/39.12, 39.18 C, 39.46 S, 60/39.51 R, 682, 683

[56] References Cited

U.S. PATENT DOCUMENTS

| | | |
|---|---|---|
| 2,298,625 | 10/1942 | Larrecq . |
| 2,379,452 | 7/1945 | Nettel et al. . |
| 2,404,938 | 7/1946 | Armacost et al. . |
| 2,420,335 | 5/1947 | Nettel et al. . |
| 2,446,106 | 7/1948 | Salzmann . |
| 2,658,349 | 11/1953 | Keller . |
| 2,691,271 | 10/1954 | McDevitt . |
| 2,714,289 | 8/1955 | Hofmann . |
| 3,127,744 | 4/1964 | Nettel . |
| 3,201,941 | 8/1965 | LaFleur . |
| 3,218,807 | 11/1965 | Berchtold et al. . |
| 3,229,575 | 7/1967 | Burbach et al. . |
| 3,293,850 | 12/1967 | Morrison . |
| 3,410,091 | 11/1968 | Frutschi . |
| 3,932,996 | 1/1976 | Bammert et al. . |

OTHER PUBLICATIONS

Hamm et al., *High Temperature Heat Exchangers and Their Use in Advanced Energy Conversion Systems*, (Paper Presented at ASME Winter Annual Meeting, Dec. 1978).

Marksberry et al., *Industrial AFB-Fired Gas Turbine Systems with Topping Combustors*, ASME Publication 80-GT-163, Mar. 1980.

Carpenter et al., *High Temperature, Coal-Fired Combustor with Ceramic Heat Exchangers for CCGT Systems*, ASME Publication 80-GT-155, Mar. 1980.

Meyer, W., *A Combined Power Station with Fluidized Bed Firing*, Vdi Berichte, No. 322, 45-49, 1978.

Primary Examiner—Louis J. Casaregola
Attorney, Agent, or Firm—W. E. Otto

[57] ABSTRACT

High temperature gas turbine generation systems utilizing multiple heating stages between the primary compressor and expander, including coal based reactors and direct fired combustors.

1 Claim, 6 Drawing Figures

HIGH TEMPERATURE GAS TURBINE SYSTEMS

BACKGROUND OF THE INVENTION

1. Field of the Invention:

This invention relates to gas turbine generation systems, and more particularly provides systems utilizing multiple heating stages including direct firing between the turbine compression and expansion stages.

2. Description of the Prior Art:

Present gas turbine technology can permit the use of relatively high turbine expander inlet temperatures, up to 1425° K. for base load applications. However, heat exchanger technology practically limits gas inlet temperatures to about 1075° K. Advanced designs have been proposed which could increase heat exchanger discharge temperatures to about 1275° K., but which still would not match the gas turbine performance potential.

To obtain higher expander inlet temperatures, components imparting heat to the expansion medium have been interposed between the compression and expansion stages. For example, it is known to heat the compressed oxidant in a convective air heater and subsequently a coal fired atmospheric fluidized bed combustor, prior to entry into the expander. In such systems gaseous products discharged from the fluidized bed combustor are directed to the convective air heater. Exhaust from the expander is directed to the fluidized bed as a heating and fluidizing gas. While such systems increase the expander inlet temperature, the increase does not take full advantage of the expander capability.

It is therefore desirable to provide gas turbine generation systems which allow utilization of the full capability of a modern gas turbine expander.

SUMMARY OF THE INVENTION

This invention provides systems which allow for utilization of the full thermal capability of existing gas turbine expanders by the direct combustion of a natural gas or petroleum distillate. The systems also provide for utilization of existing fluidized bed gasifier or carbonizer technology to generate clean fuel from coal or other hydrocarbonaceous materials, which is advantageously used to increase the temperature of the medium entering the expander. Additionally, the systems are readily compatible not only with base-load operation, but also with load follow operational requirements, and are easily controllable during system startup and shutdown operations.

The systems heat and combust fuel, through several stages, indirectly and directly with an oxidant, such as air, which flows between the compressor discharge and the expander inlet. One of the stages is a reactor which exothermically reacts coal or similar carbonaceous materials, and the compressed air flows, in heat exchange relation, through the reactor, absorbing heat. A portion of the thermal energy in at least one reactor is advantageously provided by the exhaust from the turbine expander. The air also flows to a direct combustor, where it is fired with a liquid or gaseous fuel and heated to a desired temperature, which can be up to 1425° K. The direct firing thus achieves temperatures in the high temperature product gas of the combustion, compatible with turbine state-of-the-art material technology, thereby providing increased overall system efficiency.

In a primary embodiment, air discharged from the compressor is conducted to and through a coal fired convective air heater. It then flows within conduits through a fluidized bed heater, and to a supplemental combustor. In the combustor it is reacted with a clean gaseous or liquid fuel. The air and fuel react in the combustor and are discharged to the turbine expander at the desired high temperature of approximately 1425° K. The exhaust from the expander is discharged to the fluidized bed reactor, where a portion of its thermal energy is recovered. The exhaust also functions as a fluidizing medium. The fluidized bed heater may be replaced by a pulverized coal fired combustor for heating the air.

BRIEF DESCRIPTION OF THE DRAWINGS

The advantages, nature and additional features of the invention will become more apparent from the following description, taken in connection with the accompanying drawing, in which.

DESCRIPTION OF THE PREFERRED EMBODIMENTS

Figure 1:
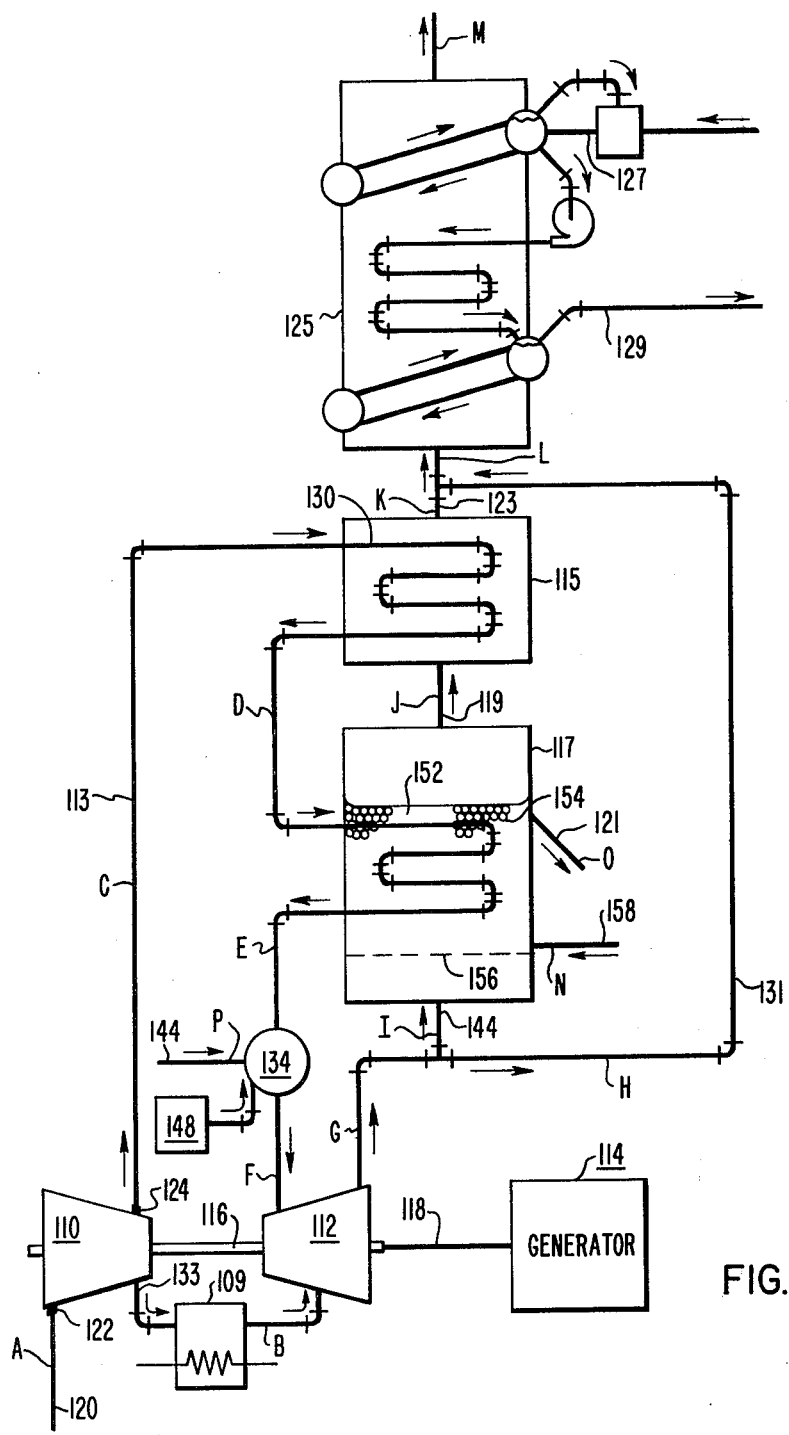
FIGS. 1 through 5 show alternate exhaust heated, supplemental fired, gas turbine system configurations in accordance with the invention.

Referring now to FIG. 1 there is shown a high temperature gas turbine generation system including a compressor 110, expander 112, and electrical generator 114. Mechanical rotational energy generated in the expander 112 is transferred through a shaft 116 to the compressor 110, and through another shaft 118 to the generator 114. Reference numerals used throughout this description all contain three digits. Common final digits among the numerals of the various figures refer to similar elements. For example, reference numerals 110, 210, and 310 identify a compressor, respectively, in FIGS. 1, 2, and 3.

An oxidant, such as oxygen or air, is fed through means for conducting the oxidant, such as a conduit 120, to an inlet 122 of the compressor 110. Typically, air enters the compressor at atmospheric temperature and pressure conditions. The air is compressed, and discharged from compressor 110 into conduit 113 at an increased pressure and temperature through an outlet 124. Also shown is a conduit 133 through which a minor portion of the compressed air is directed from the compressor 110 to the expander 112 through a heater exchanger 109 to provide cooling flow for the expander vanes, blades and rotor.

Compressed air from the compressor 110 flows in series through a first reactor or combustion heater 115, and a second reactor 117, prior to direct combustion in a supplemental combustor 134. Second reactor 117 is preferably of the atmospheric fluidized bed type, reacting particulate coal and sorbent entering through a conduit 158 with discharge gas from the expander 112 to produce a fuel gas discharged through a conduit 119. Spent sorbent and ash are removed through a conduit 121. The fuel gas is burned in the first reactor 115, of the combustion heating type. Reaction products are discharged through a conduit 123 and waste heat is recovered in a waste heat boiler 125 which receives a condensate through an inlet 127 and discharges process steam through an outlet 129. A portion of the discharge gas from the expander 112 bypasses the reactors 117, 115 through conduit 131, and heat therein is also recovered in the waste heater boiler 125. The bypass is required to minimize the size and cost of the atmospheric fluidized combustion air heater. The fluidized bed reactor 117 can also be replaced with a pulverized coal fired combustor, for example a cyclone combustor with radiant heated air pipes in the wall.

Subsequent to the two stage exhaust fired heating through heat exchange and reaction within the reactors 115, 117, the compressed air is reacted in the combustor 134 with a clean gaseous or liquid fuel, such as natural gas provided from an independent fuel source 148.

Table I presents typical state points throughout the system of FIG. 1, lettered stations in Table I corresponding to the letter in FIG. 1.

| STATION | PRESSURE (kPa) | TEMPERATURE (°K.) | REFERRED FLOW RATE |
|---|---|---|---|
| A | 101.4 | 288 | 1.000 |
| B | 1006.0 | 506 | 0.107 |
| C | 1006.0 | 597 | 0.893 |
| D | 990.8 | 703 | 0.893 |
| E | 976.3 | 1089 | 0.893 |
| F | 966.0 | 1367 | 0.899 |
| G | 110.3 | 811 | 1.006 |
| H | 110.3 | 811 | 0.771 |
| I | 110.3 | 811 | 0.235 |
| J | 105.2 | 1144 | 0.253 |
| K | 104.1 | 811 | 0.253 |
| L | 104.1 | 811 | 1.024 |
| M | 101.4 | 422 | 1.024 |
| N | 124.1 | 288 | 0.018 |
| O | 105.2 | 1144 | 0.009 |
| P | 1723.8 | 288 | 0.006 |

As shown from Table I, the high temperature gaseous product enters the expander at 1425° K. Thus, direct combustion as disclosed provides a temperature increase at the expander inlet of approximately 300° K. with respect to prior systems.

The supplemental combustor 134 can be readily adjusted to control the state of the gaseous product entering the expander 112, advantageously allowing other than base load operation. Additionally, startup and shutdown operation is substantially simplified as compared to prior indirectly heated systems. Particularly for startup and shutdown, a secondary source of fuel gas or liquid can be provided to the combustor 134, shown as conduit 144.

Reactor 117 contains a fluidized bed 152 of particulate hydrocarbonaceous material 154, such as coal, fluidized above a grid plate 156. The coal is fed to the reactor 117 through the conduit 158, and a sorbent, such as limestone, is fed to the reactor through the same or a separate conduit. The discharge gas entering the reactor 117 through the conduit 144 causes fluidization. Within the fluidized bed 152, combustion and desulfurization take place.

Figure 2:
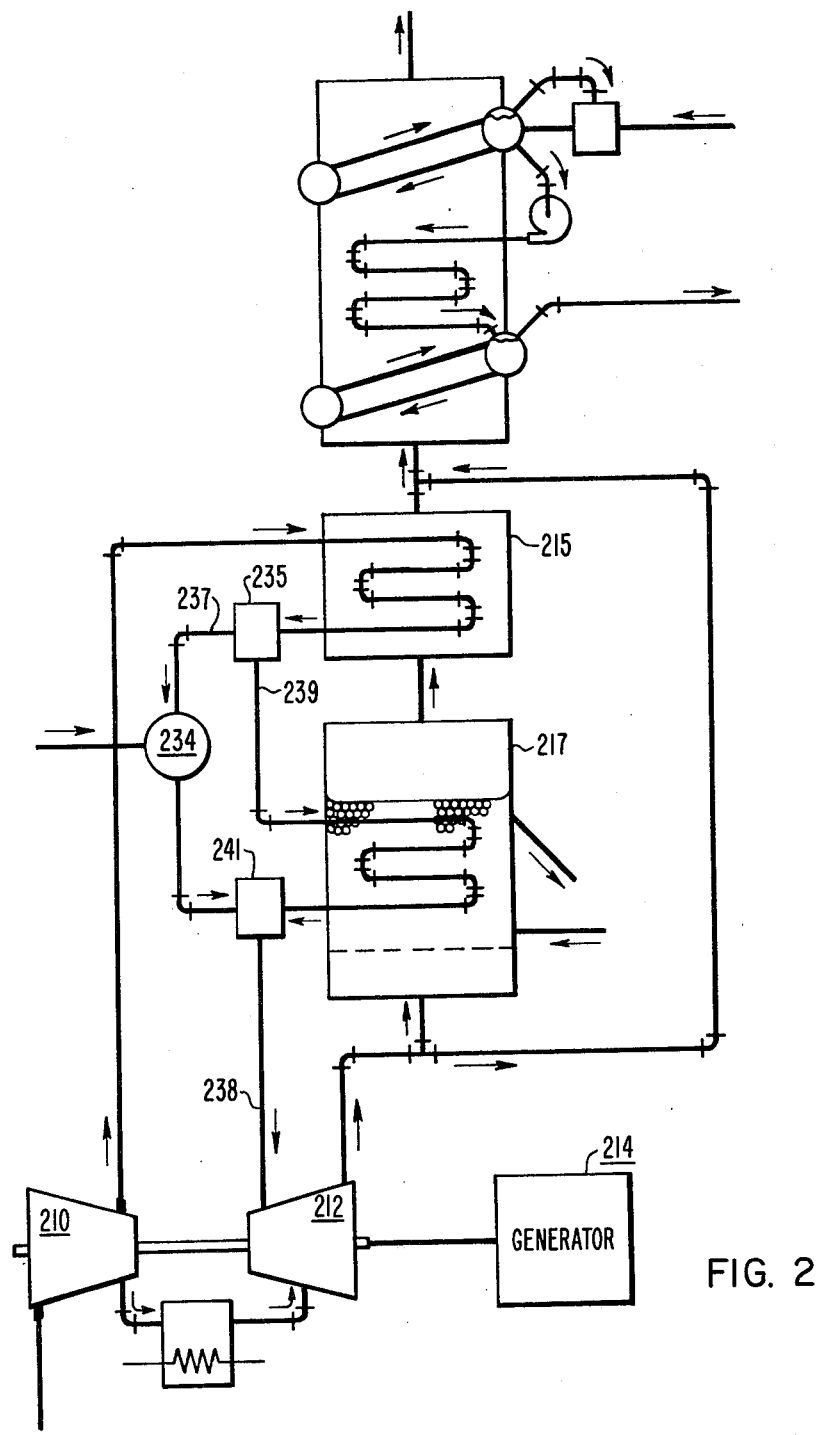

FIG. 2 shows a system similar to FIG. 1 except that a portion of the compressed air enters the combustor 234 after passing through the first heater 215. The air is split at valve means 235 so that a portion passes through a conduit 237 to the combustor 234, and a second portion passes through conduit 239 to the second reactor 217. Similarly, the high temperature gaseous product discharged from the combustor is mixed in a housing 241 with air from the second reactor 217, and flows through conduit 238 to the expander 212. This embodiment is particularly advantageous because it avoids the design of a combustor which will accept 1075° K. combustion air.

Figure 3:
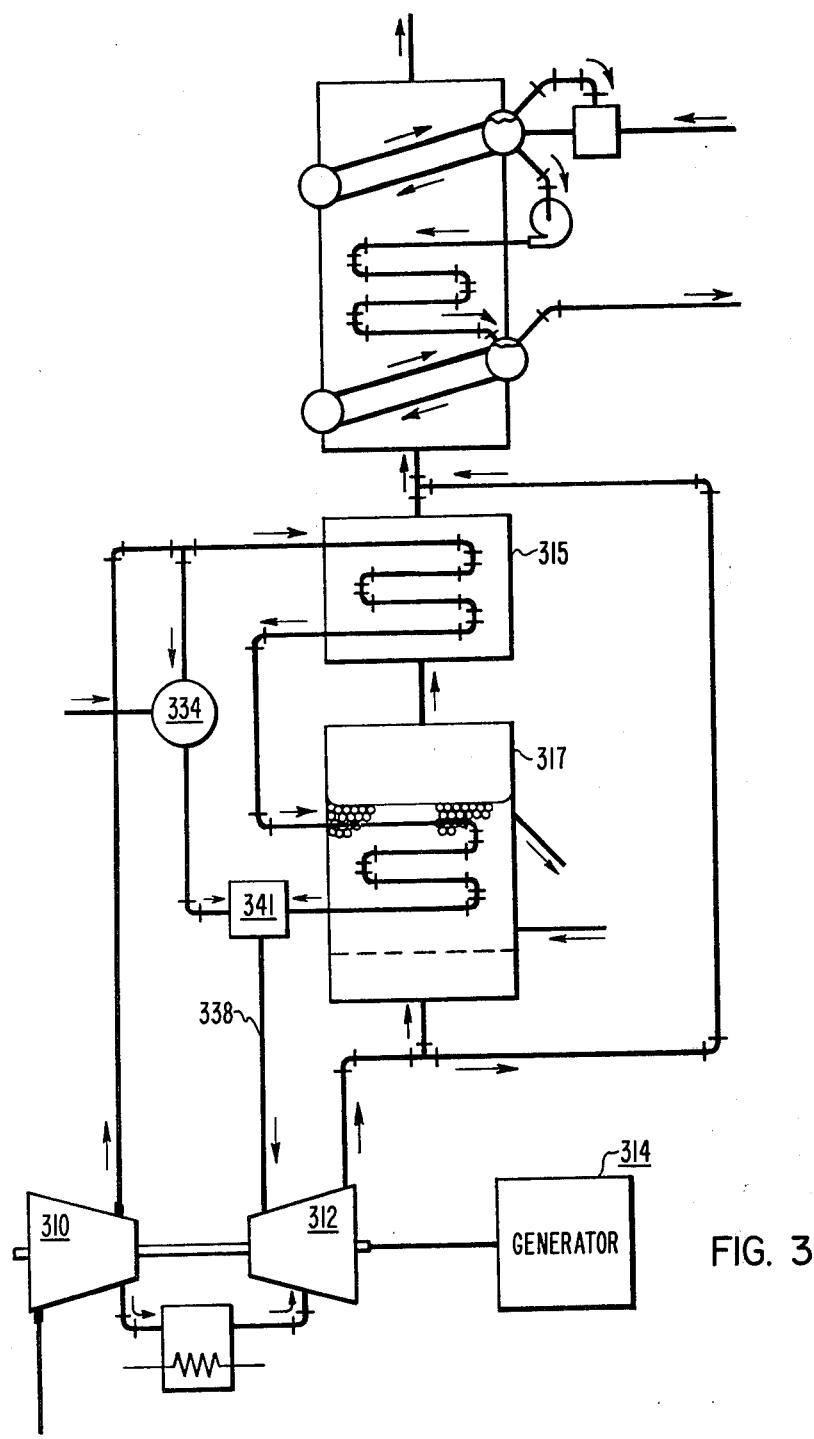

FIG. 3 shows a system which is similar to that of FIG. 2, except that a first portion of the compressed air directly from the compressor 310 is burned in the combustor 334, and a second portion of the air is placed in heat exchange relation with the two reactors 315, 317. The high temperature combustion product gas from the combustor 334 is mixed in a housing 341 with the heated second portion and then directed through conduit 338 to the expander 312. This system is particularly advantageous because it permits the use of a conventional gas turbine combustor which uses compressor discharge air at relatively low temperature as the oxidant.

Figure 4:
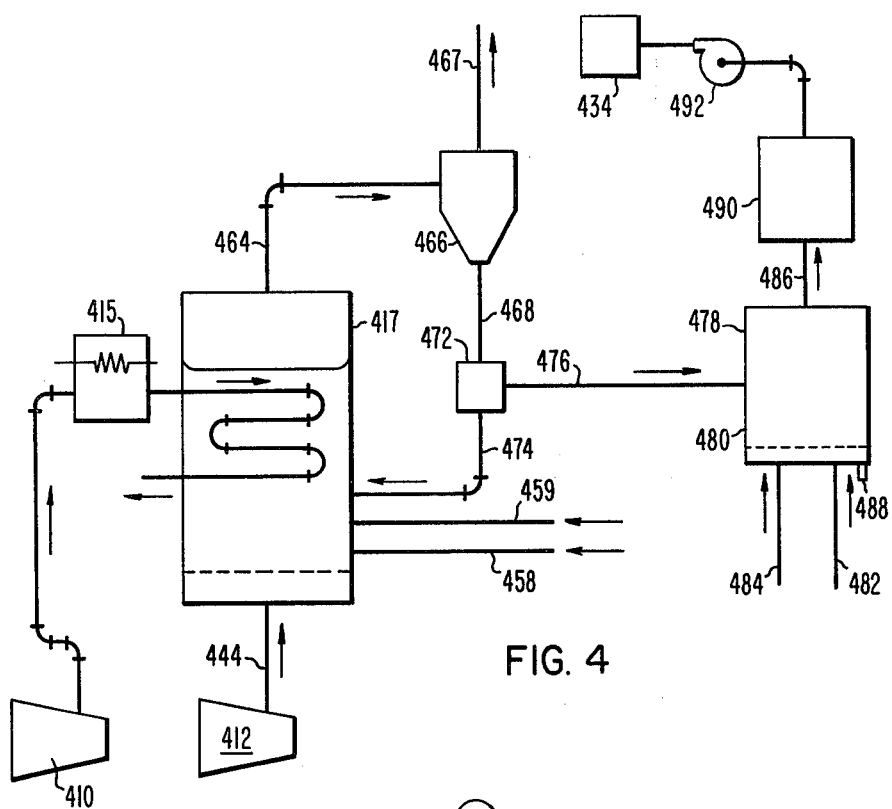

An alternative system, where a fuel gas for the combustor is generated from the oxidant heating apparatus, is shown in FIG. 4. Here, compressed oxidant from compressor 410 and heater 415 passes through a fluidized bed reactor 417, similar to the system of FIG. 1. The reactor 417 receives particulate coal through conduit 458, sorbent through a conduit 459, recycled char through a conduit 474, and expander 412 discharge through a conduit 444. Within the fluidized bed combustion and desulfurization take place, achieving temperatures in the range of 1025° to 1275° K., and discharging char and ash carried in a product gas of carbon dioxide, water vapor and nitrogen through a conduit 464 to a cyclone 466. The waste combustion products are discharged from the cyclone 466 through a conduit 467. Waste heat in these products can be recovered in heat exchange apparatus, not shown. Char fines, sorbent fines and ash are discharged from the cyclone 466 through a conduit 468, and are selectively directed through valve means 472 and conduits 474, 476 back to the reactor 417 and to a fluidized bed gasifier 478. The bulk of the char fines enter reactor 478, and are fluidized above a grid plate 480. Steam and air are fed to the reactor 478, respectively, through conduits 482 and 484. Within the reactor 478 the char is gasified, discharging a raw fuel gas through a conduit 486 and waste ash through a bottom outlet 488. The fuel gas is preferably passed through cleaning means such as particulate removal purification apparatus 490, where solid particulates are removed, and discharged directly or through a compressor 492 to the combustor 434.

Figure 5:
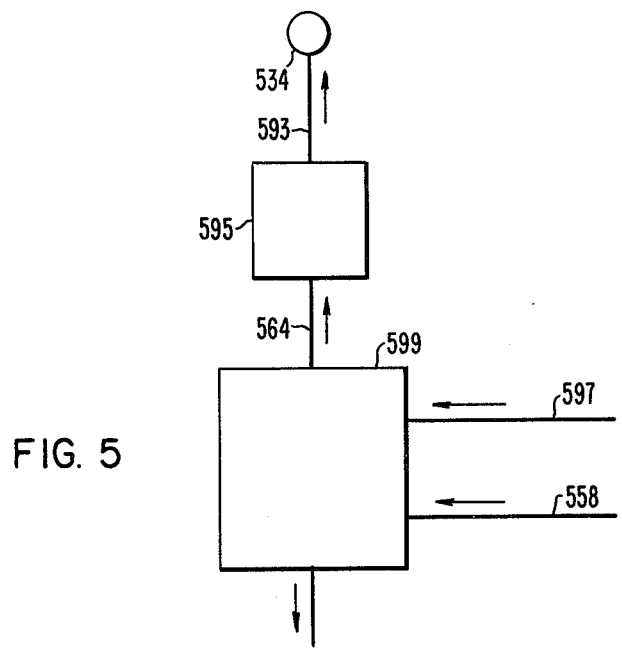

Another manner in which the system can generate a clean fuel gas burning in a combustor 534 is shown in FIG. 5. Here, the reactor 417 of FIG. 4 is replaced with a carbonizer 599. Particulate coal enters the carbonizer 599 through a conduit 558, and heat, for example in the form of a hot gas, enters the carbonizer through a conduit 597. The carbonizer 599 generates a raw pyrolysis gas which is directed through conduit 563 to conventional gas cleaning apparatus 595. The cleaned gas is then discharged through a conduit 593 to the combustor 534, to react with heated oxidant.

Figure 6:
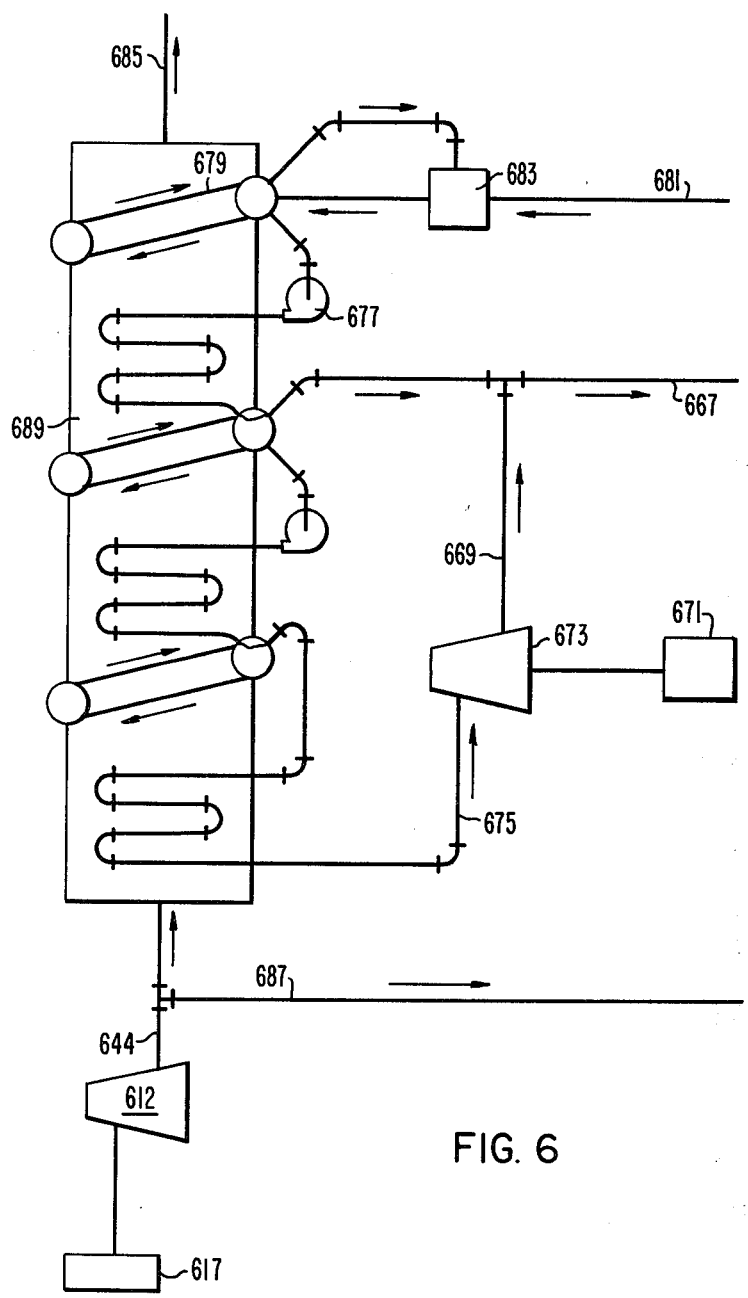

The disclosed systems are readily compatible with so-called combined cycle power generation or cogeneration applications. A particular embodiment is shown in FIG. 6. Here, the combustion products are directed to the expander 612 from any of the systems discussed above. Preferably, however, pulverized coal and preheated oxidant react in a combustion heater 617, and the products are directed through a cleaning apparatus to the expander 612. The discharge from an expander 612 is directed through conduit 644 to a heat recovering steam generator 689. A portion of the discharge can be directed through conduit 687 to provide heat to other subsystems, such as a process heat utilization system. The primary stream, however, enters the steam generator 689 and discharges heat to a utilization fluid, such as water, to be transformed into steam. The discharge from the expander 612 which enters the steam generator 689 is then discharged to a stack, or to another process subsystem, through conduit 685. As shown, recycled condensate enters a feedwater heater 683 from a conduit 681, and is discharged into the cascading heating loops 679 and condensate pumps 677 of the steam generator 689. Steam which is generated is passed through conduit 675 to a steam turbine 673, which drives a generator 671. Discharge from the steam turbine 673 is directed through conduits 669, 667 as process steam. The process steam, subsequent to giving up a portion of its energy and condensation, is returned to the feedwater heater 683 through conduit 681.

There have been described systems utilizing both directly and indirectly fired combustion of compressed oxidant and other oxidant heating stages fired in part by carbonaceous material clean fuel and turbine expander discharge. The systems all provide a high temperature combustion product to the turbine expander which allows for substantial increases in overall system efficiency.

We claim:

1. A high temperature gas turbine generation system comprising:
   a compressor;
   means for conducting a gaseous oxidant to said compressor;
   a combustion heater wherein one of a fuel gas and a pulverized carbonaceous material is combusted to produce heat and reaction products;
   means for conducting compressed gaseous oxidant to and through said combustion heater so as to heat said oxidant;
   a reactor housing a fluidized bed wherein particulate coal is reacted with a discharge gas to produce heat and said fuel gas;
   means for conducting said fuel gas from said reactor to said combustion heater;
   a combustor producing a high temperature gaseous product from said heated oxidant and a gaseous fuel;
   means for conducting said gaseous fuel to said combustor;
   means for conducting a first portion of said heated oxidant to said combustor;
   means for conducting a second portion of said heated oxidant to and through said reactor so as to further heat said second portion of oxidant;
   means for mixing said high temperature gaseous product and said further heated second portion of oxidant into a mixture;
   an expander having an inlet for receiving said mixture and an outlet for discharging said discharge gas;
   means for conducting said mixture to said expander inlet; and
   means for conducting said discharge gas from said expander outlet to said reactor.

* * * * *